(12) United States Patent
Sakamoto et al.

(10) Patent No.: US 11,295,177 B2
(45) Date of Patent: Apr. 5, 2022

(54) ENSEMBLE WEAK SUPPORT VECTOR MACHINES

(71) Applicant: International Business Machines Corporation, Armonk, NY (US)

(72) Inventors: Masaharu Sakamoto, Yokohama (JP); Yasue Makino, Sumida-ku (JP); Hiromi Kobayashi, Setagaya-ku (JP); Hirokazu Kobayashi, Setagaya-ku (JP)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 16/832,217

(22) Filed: Mar. 27, 2020

(65) Prior Publication Data
US 2021/0303937 A1    Sep. 30, 2021

(51) Int. Cl.
*G06K 9/62* (2022.01)
*G06N 20/10* (2019.01)
*G06N 20/20* (2019.01)

(52) U.S. Cl.
CPC ......... *G06K 9/6277* (2013.01); *G06K 9/6257* (2013.01); *G06K 9/6269* (2013.01); *G06N 20/10* (2019.01); *G06N 20/20* (2019.01)

(58) Field of Classification Search
CPC .. G06K 9/6277; G06K 9/6257; G06K 9/6269; G06N 20/20; G06N 20/10
See application file for complete search history.

(56) References Cited

U.S. PATENT DOCUMENTS

| 10,049,302 | B1 | 8/2018 | Liu |
| 10,325,150 | B2 | 6/2019 | Lu |
| 2018/0260699 | A1 | 9/2018 | Natroshvili |
| 2019/0205621 | A1 | 7/2019 | Moussaffi |

(Continued)

OTHER PUBLICATIONS

Shruti Asmita et al, "Regularized Weighted Ensemble of Deep Classifiers", 2015, International Journal on Computational Sciences & Applications (IJCSA) vol. 5, No. 3, pp. 47-65 (19 pages) (Year: 2015).*

(Continued)

*Primary Examiner* — David F Dunphy
(74) *Attorney, Agent, or Firm* — Randy E. Tejeda

(57) ABSTRACT

In an approach to improving accuracy through weak model aggregation, one or more computer processors generating a plurality of hyperparameter sets, wherein each hyperparameter set in the plurality of hyperparameter sets contains one or more hyperparameters varied to increase over-training in one or more models, wherein over-training includes overfitting or underfitting. The one or more computer processors create a plurality of weak models utilizing a created bootstrap dataset in a plurality of created bootstrap datasets, a corresponding extracted explanatory variable set, and a corresponding hyperparameter set in the generated plurality of hyperparameter sets, wherein each weak model in a created plurality of weak models shares at least the created bootstrap dataset, the extracted explanatory variable set, the generated hyperparameter set, a machine learning technique, or a model architecture. The one or more computer processors predict a classification for an unknown datapoint by aggregating the created plurality of weak models.

20 Claims, 5 Drawing Sheets

(56) References Cited

U.S. PATENT DOCUMENTS

2019/0303795 A1* 10/2019 Khiari .................... G06N 5/003

OTHER PUBLICATIONS

Hyun-Chui Kim et al, "Support Vector Machine Ensemble with Bagging", 2002, SVM 2002, LNCS 2388, pp. 397-408 (13 pages) (Year: 2002).*
Breiman, Leo, "Random Forests", Final manuscript Apr. 11, 2001, © 2001 Kluwer Academic Publishers, 28 pages.
Wandekokem, Estefhan Dazzi, "Support Vector Machine Ensemble Based on Feature and Hyperparameter Variation", 2011, 74 pages.

* cited by examiner

ENSEMBLE WEAK SUPPORT VECTOR MACHINES

BACKGROUND

The present invention relates generally to the field of machine learning, and more particularly to overfitted support vector machines.

Machine learning (ML) is the scientific study of algorithms and statistical models that computer systems use to perform a specific task without using explicit instructions, relying on patterns and inference instead. Machine learning is seen as a subset of artificial intelligence. Machine learning algorithms build a mathematical model based on sample data, known as training data, in order to make predictions or decisions without being explicitly programmed to perform the task. Machine learning algorithms are used in a wide variety of applications, such as email filtering and computer vision, where it is difficult or infeasible to develop a conventional algorithm for effectively performing the task.

In machine learning, a hyperparameter is a configuration that is external to the model and whose value cannot be estimated from data. Hyperparameters are used in processes to help estimate model parameters. Hyperparameter are set before the learning (e.g., training) process begins by contrast, the values of other parameters are derived via training. Different model training algorithms require different hyperparameters, some simple algorithms, such as least squares regression, require none. Given a set of hyperparameters, a training algorithm learns the parameter values from the data for instance, least absolute shrinkage and selection operator (LASSO) is an algorithm that adds a regularization hyperparameter to least squares regression, required to be set before estimating the parameters through the training algorithm. Similar machine learning models can require different hyperparameters (e.g., different constraints, weights, or learning rates) to generalize different data patterns.

Support-vector machines (SVMs) are supervised learning models with associated learning algorithms that analyze data used for classification and regression analysis. Given a set of training examples, each marked as belonging to one or the other of two categories, an SVM training algorithm builds a model that assigns new examples to one category or the other, making a non-probabilistic binary linear classifier. An SVM model is a represents examples as mapped points in space such that the examples of the separate categories are divided by a clear gap that is as wide as possible. New examples are then mapped into that same space and predicted to belong to a category based on the side of the gap on which they fall.

SUMMARY

Embodiments of the present invention disclose a computer-implemented method, a computer program product, and a system for improving model accuracy through weak model aggregation. The computer-implemented method includes one or more computer processors generating a plurality of hyperparameter sets, wherein each hyperparameter set in the plurality of hyperparameter sets contains one or more hyperparameters varied to increase over-training in one or more models, wherein over-training includes overfitting or underfitting. The one or more computer processors create a plurality of weak models utilizing a created bootstrap dataset in a plurality of created bootstrap datasets, a corresponding extracted explanatory variable set, and a corresponding hyperparameter set in the generated plurality of hyperparameter sets, wherein each weak model in a created plurality of weak models shares at least the created bootstrap dataset, the extracted explanatory variable set, the generated hyperparameter set, a machine learning technique, or a model architecture. The one or more computer processors predict a classification for an unknown datapoint by aggregating the created plurality of weak models.

DETAILED DESCRIPTION

Traditionally many machine learning techniques and models require substantial amounts of training data (e.g., exponentially increasing as problem complexity increases) to ensure model accuracy and precision dependent on number of classes, number of input features, and number of model parameters. Models assume that there is sufficient training data, but in practice, there are many instances and situations where required training data is unavailable. Commonly a strong model allows for generalization using training data to any data from a problem domain. Models (i.e., weak models) trained with insufficient training data do not generalize well and suffer from low accuracy and precision due to overfitting and underfitting. Traditionally, overfitting occurs when a model learns the detail and noise in the training data to an extent that it negatively impacts the performance of the model on new data. Underfitted models neither accurately represent the training data nor generalize to new data. Weak models include models that are inaccurate and imprecise due to overfitting (i.e., over-trained) or underfitting based on limited training data.

Embodiments of the present invention improve accuracy by ensemble learning of models (i.e., support vector machines (SVMs)) that have over-trained due to a lack of training data. Embodiments of the present invention extract a plurality of bootstrap samples from a training dataset. Embodiments of the presentation invention randomly generate a plurality of explanatory variable sets from bootstrap samples. Embodiments of the present invention create a plurality of hyperparameters that cause over-training (i.e., overfitting, underfitting, low accuracy, etc.). Embodiments of the present invention create a plurality of weak models utilizing one or more over-training hyperparameters. Embodiments of the present invention classify one or more data points based on an aggregation of a plurality of weak models. Embodiments of the present invention recognize that computational efficiency is improved by aggregating a plurality of weak models instead of retraining or destroying said models. Embodiments of the present invention recognize that overall accuracy is increased by aggregating a plurality of weak models. Implementation of embodiments of the invention may take a variety of forms, and exemplary implementation details are discussed subsequently with reference to the Figures.

The present invention will now be described in detail with reference to the Figures.

Figure 1:
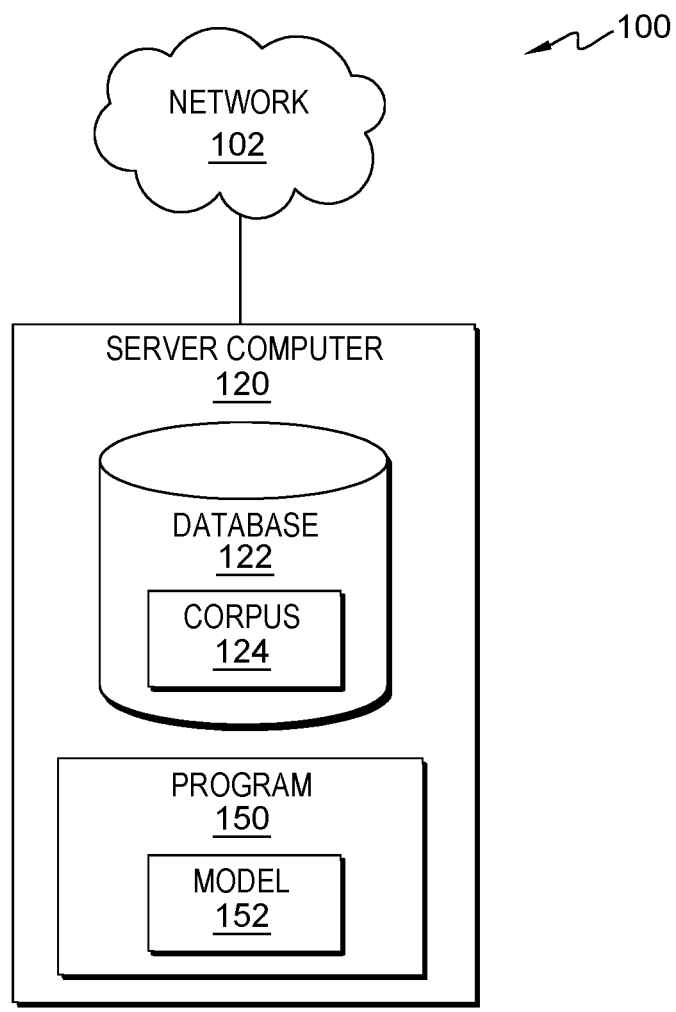
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 5.

Database 122 is a repository for data used by program 150. In the depicted embodiment, database 122 resides on server computer 120. In another embodiment, database 122 may reside elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as one or more sets of hyperparameters and model statistics associated with one or more trained models. In the depicted embodiment, database 122 contains corpus 124.

Corpus 124 contains one or more examples, sets of training data, data structures, and/or variables used to fit the parameters of a specified model. The contained data comprises of pairs of input vectors with associated output vectors. In an embodiment, corpus 124 may contain one or more sets of one or more instances of unclassified or classified (e.g., labelled) data, hereinafter referred to as training statements. In another embodiment, the training data contains an array of training statements organized in labelled training sets. For example, a plurality of training sets include "positive" and "negative" labels paired with associated training statements (e.g., words, sentences, etc.). In an embodiment, each training set includes a label and an associated array or set of training statements which can be utilized to train one or more models. In an embodiment, corpus 124 contains unprocessed training data. In an alternative embodiment, corpus 124 contains natural language processed (NLP) (e.g., section filtering, sentence splitting, sentence tokenizer, part of speech (POS) tagging, tf-idf, etc.) feature sets. In a further embodiment, corpus 124 contains vectorized (i.e., one-hot encoding, word embedded, dimension reduced, etc.) training sets, associated training statements, and labels.

Models 152 is representative of a plurality of models utilizing learning techniques to train, calculate weights, ingest inputs, and output a plurality of solution vectors. In an embodiment, models 152 include any number of and/or combination of models and model types. In a further embodiment, models 152 comprises of any combination of deep learning model, technique, and algorithm (e.g., decision trees, Naive Bayes classification, support vector machines for classification problems, random forest for classification and regression, linear regression, least squares regression, logistic regression). In an embodiment, models 152 utilize transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, models 152 is a plurality of support vector machines (SVMs). The training of models 152 is depicted and described in further detail with respect to FIG. 2.

Program 150 is a program for improving model accuracy utilizing an ensemble of created and trained weak models and aggregating multiple predictions from the ensemble of weak models. In various embodiments, program 150 may implement the following steps: generate a plurality of hyperparameter sets, wherein each hyperparameter set in the plurality of hyperparameter sets contains one or more hyperparameters varied to increase over-training in one or more models, wherein over-training includes overfitting or underfitting; create a plurality of weak models utilizing a created bootstrap dataset in a plurality of created bootstrap datasets, a corresponding extracted explanatory variable set, and a corresponding hyperparameter set in the generated plurality of hyperparameter sets, wherein each weak model in a created plurality of weak models shares at least the created bootstrap dataset, the extracted explanatory variable set, the generated hyperparameter set, a machine learning technique, or a model architecture; predict a classification for an unknown datapoint by aggregating the created plurality of weak models. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. Program 150 is depicted and described in further detail with respect to FIG. 2.

The present invention may contain various accessible data sources, such as database 122 and corpus 124, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
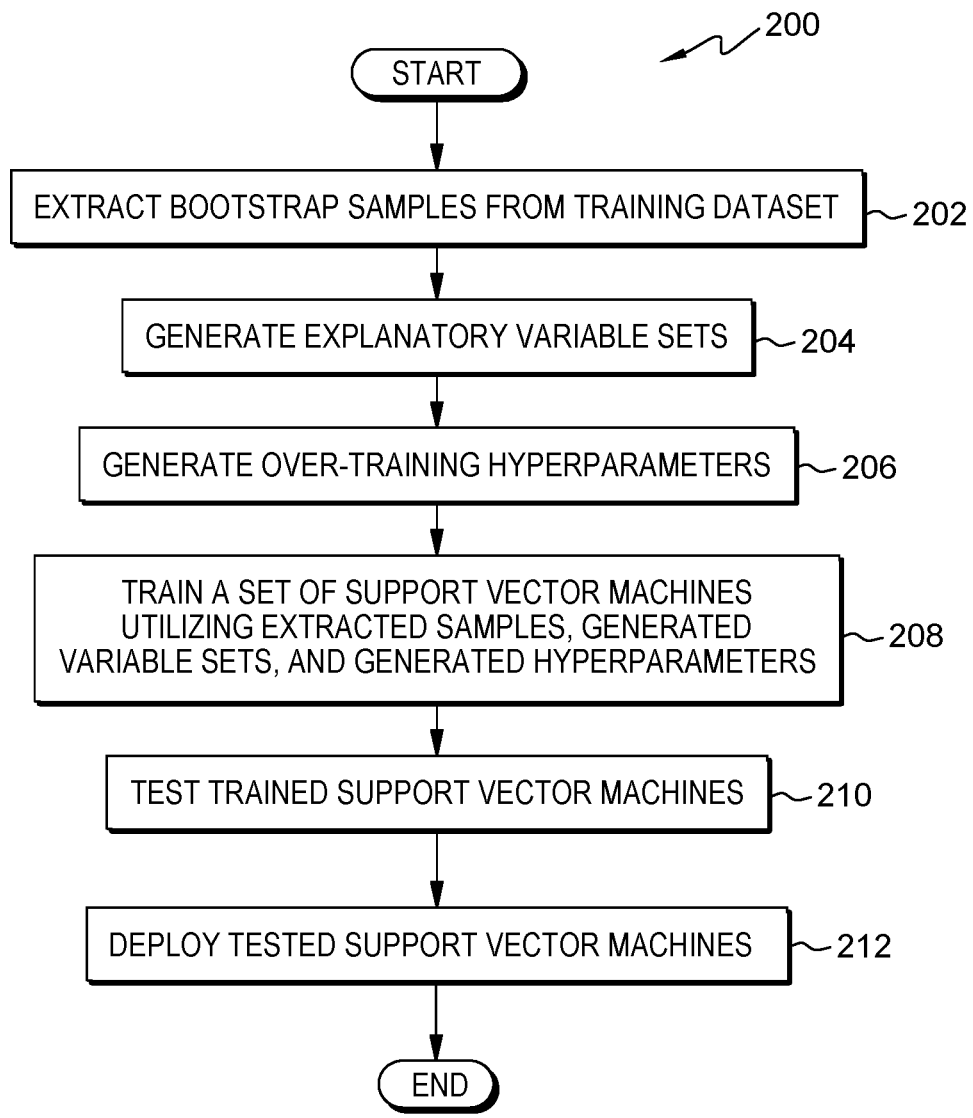
FIG. 2 is a flowchart depicting operational steps of a program, on a server computer within the computational environment of FIG. 1, for improving model accuracy utilizing an ensemble of weak models, in accordance with an embodiment of the present invention.

FIG. 2 is a flowchart depicting operational steps of program 150 for improving accuracy utilizing an ensemble of weak models, in accordance with an embodiment of the present invention.

Program 150 extracts bootstrap samples from training dataset (step 202). In an embodiment, program 150 initiates when promoted by a user. In another embodiment, program 150 initiates when detecting or receiving training data or one or more (e.g., a plurality) training sets. In various embodiments, program 150 retrieves training data or one or more training sets from database 122 and corpus 124. In another embodiment, program 150 retrieves training data or one or more training sets from a plurality of sources, such as a publicly available external source, and stores said information within corpus 124. For example, program 150 retrieves a set of 2D images from an online image repository.

Responsive to program 150 receiving or retrieving training data, program 150 creates a plurality of bootstrap datasets from the received or retrieved training data. In an embodiment, program 150 utilizes a bootstrap method to create the plurality of M bootstrap datasets. In various embodiments, program 150 creates (e.g., sampling with replacement) the plurality of bootstrap datasets by determining a size of the bootstrap dataset, randomly selecting a training statement from the training dataset, and adding the training statement to the bootstrap dataset until the bootstrap dataset meets the determined size. These embodiments allow for a given training statement to be included in multiple bootstrap datasets. For example, program 150 creates a plurality of bootstrap datasets each containing 120 training statements from a training dataset that contains 1200 training statements. In another embodiment, program 150 partitions training data, associated information, and vectors, contained within corpus 124, into multiple training, testing, and validation sets. In this embodiment, program 150, dependent on the utilized training method (supervised vs unsupervised), classifies, pairs, associates, and/or links said sets with one or more labels or output vectors. In various embodiments, program 150 non-deterministically divides the processed sets into training, validation, test sets. In various embodiments, program 150 utilizes cross validation techniques, such as K-Fold cross validation, to create one or more testing and validation sets associated with a created bootstrap dataset.

Program 150 generates explanatory variable sets (step 204). Program 150 generates a plurality of N explanatory variable sets for each bootstrap dataset in the created plurality of bootstrap datasets. In an embodiment, program 150 extracts independent variables and features from each bootstrap dataset and generates a plurality of independent variable sets. In this embodiment, program 150 associates each generated explanatory variable set with a bootstrap dataset. In an embodiment, explanatory variable sets include independent variables, extracted feature sets, processed sets (e.g., naturally language processed, normalized, etc.).

Program 150 generates over-training hyperparameters (step 206). In an embodiment, program 150 generates a plurality of K hyperparameter sets for each set of generated explanatory variables, as described in step 204 and depicted in FIG. 3. In this embodiment, program 150 varies the hyperparameters in each set to increase or exaggerate over-training (e.g., overfitting and/or underfitting) of a resulting model. In an embodiment, program 150 utilizes the following as a loss function:

$$\min_{w,\xi}\left(\frac{1}{2}w^t w + C\Sigma_i \xi_i\right) \quad (1)$$

With respect to equation (1), C is a cost parameter, $\xi$ is the number of misclassifications, i is the number of samples, and w is a weight vector.

In an embodiment, program 150 utilizes the following as a kernel function:

$$k(x_i, x_j) = \exp(-\gamma \|x_i - x_j\|^2) \quad (2)$$

With respect to equation (2), x is a training statement and $\gamma$ is a regularization term. Increasing $\gamma$ results in complex decision boundaries.

Gaussian kernel SVMs, typically, utilize a C between 1 and 10 and a $\gamma$ between 3/k-6/k where k is the number of explanatory variables in an associated explanatory variable set. In an embodiment, program 150 utilizes a C between $10^2$ and $10^6$ and a $\gamma$ between −4 and −2. When C is increased, emphasis is placed on minimizing the number of misclassifications. The resulting model is over-trained to the training sample. In various embodiments, program 150 adjusts a plurality of SVM models with a large valued cost parameter creating over-trained models. For example, although SVMs are generally strong learners, the training dataset and associated hyperparameters are adjusted to cause over-training in order to create a plurality of weak learning SVMs performing poorly for unknown (i.e., not contained in the training dataset) data. In an embodiment, program 150 maintains N*K hyperparameter sets. In this embodiment, program 150 constructs a plurality of hyperparameter sets associated with a plurality of model sets utilizing a plurality of heuristics common in deep learning such as deriving hyperparameters based on the number of: leaves or depth of a tree, latent factors in a matrix factorization, learning rate, hidden layers in a neural network, and the number of clusters. In various embodiments, program 150 generates hyperparameter sets based on historical models and associated bootstrap datasets, explanatory variable sets, and hyperparameter sets.

Program 150 trains a set of support vector machines utilizing extracted bootstrap samples, generated variable sets, and generated hyperparameters (step 208). In an embodiment, program 150 creates, trains, and maintains a plurality (i.e., M*N*K) of model sets, wherein each set shares at least a bootstrap dataset, explanatory variable set, hyperparameters set, machine learning technique, and/or model architecture (e.g., SVM, neural network, etc.). In various embodiments, program 150 each model in the plurality of model sets are associated with one or more weights and hyperparameter sets. In an embodiment, program 150 initializes the set of models with randomly generated weights. In various embodiments, program 150 utilizes weights utilized in historical or previously iterated/trained models. For example, the weights of a previously trained model, that failed to exceed an accuracy threshold, are utilized in a subsequent training iteration. Program 150 trains the set of SVMs by utilizing a plurality of training methods (e.g., supervised, unsupervised, etc.) based on the extracted bootstrap samples, generated variable sets, and generated hyperparameters, as detailed above. In an embodiment, program 150 trains the set of models with a plurality of feature vectors originating from the bootstrap datasets, explanatory sets extracted from the training data and associated labels. In an embodiment, program 150 trains a set of neural networks that utilizes supervised training to determine the difference between a prediction and a target (i.e., the error), and back-propagate the difference through the layers such that said model "learns." In an embodiment, program 150 determines whether a sufficient accuracy is obtained by utilizing test sets and the associated test labels. In another embodiment, program 150 utilizes cross-entropy (e.g., Kullback-Leibler (KL) divergence, etc.) as a loss function to determine the level of accuracy of the model.

Program 150 tests trained support variable machines (step 210). Program 150 tests the set of created models as described in step 208. In an embodiment, program 150 records a plurality of model characteristics, such as model configuration (i.e., number of neurons, number of layers, tensor size, numbers of activations, parameter size, trainable parameters, and non-trainable parameters), model execution (i.e., system utilization (e.g., CPU, GPU, memory)), model characteristics (i.e., time per iteration, compute time, CPU time utilization, and network latency), model hyperparameters (i.e., batch size, training samples, evaluation samples, loss function, optimizer, learning rate, and momentum), and data configuration (i.e., dataset size and data processing time). In various embodiments, program 150 creates a set of testing data (i.e., reserved or unknown datapoints) for each set of created models and utilizes each created set of testing data to test each created model. In an embodiment, program 150 aggregates a set of testing data and associated models and utilizes a majority decision to predict aggregated model accuracy. For example, program 150 inputs the testing data into each model in a set of models and utilizes the aggregated (i.e., integrated) prediction for each training statement in the testing data to formulate an aggregated prediction for the entire model set. In another embodiment, program 150 utilizes a calculated average of the predictions outputted by the set of models to determine an aggregate decision or majority of the tested set of models.

Program 150 deploys tested support vector machines (step 212). In an embodiment, program 150 deploys one or more trained models to a production environment or server. In various embodiments, program 150 may select multiple ranked models and deploy the models to the same production environment or deploy the models to a plurality of respective production, test, or auxiliary environments. In another embodiment, program 150 selected a deployment environment to deploy one or more trained models out of a plurality of deployment environments (e.g., test, production, backup server, containers, or virtual machines). In an embodiment, the user instructs program 150 to deploy a specific model. In this embodiment, the user may utilize an application (not depicted) to display a plurality of trained models (e.g., models 152) and allow the user the ability to select and deploy one or more models. In a further embodiment, user inputs a destination server for program 150 to deploy the trained models. In various embodiments, program 150 deploys a set of created and test models as a unified ensemble of models, allowing program 150 to utilize the unified package of models to input unknown data and output highly accurate predictions despite the individual weakness of each model in the package. In a further embodiment, program 150 utilizes the deployed ensemble of models to classify one or more unknown (i.e., not contained in a training dataset) data points. For example, program 150 utilizes the deployed ensemble of models to classify one or more datapoints representing potential programming defects, where program 150 can prioritize which defects to repair first based on an associated classification. In this example, program 150 initiates a defect repair based on the highest prioritized defect (e.g., highest numerical percentage or probability). In another example, program 150 provides a list of potential defects along with an associated classification probability to a user, allowing the user to select a defect for program 150 to initiate a repair.

In an example scenario, program 150 obtains training data for predicting winning or losing outcomes from a plurality of contained data points such as standing speed, waist height, weight, and average match time extracted visually from a video. In this example scenario, acquiring the data from the video is costly monetarily and computationally. Here, training and testing is performed with a small amount of data (e.g., 40 data points per player). Program 150 created and trained 375 weak SVMs with 3 (i.e., M) bootstrap datasets (e.g., shuffled every trial) where each bootstrap dataset contains 5 (i.e., N) extracted explanatory variable sets where each explanatory variable set is associated with 25 (i.e., K) hyperparameter sets. Program 150 demonstrates an accuracy of 70.20% compared to a traditional SVM at 66.50%, and a random forest at 66.30%. Here, program 150 improves accuracy by 3.9% with respect to a traditional SVM and 3.7% with respect to a random forest.

Figure 3:
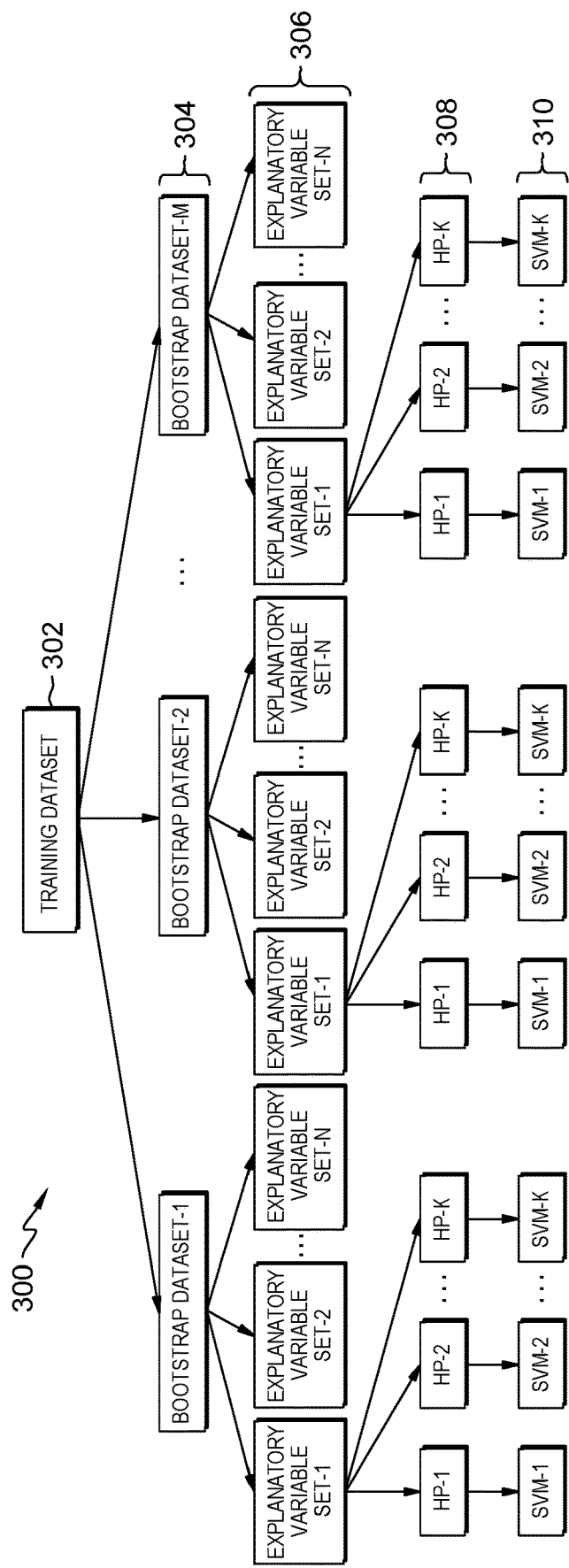
FIG. 3 illustrates an exemplary workflow of a program within the computational environment of FIG. 1, in accordance with an embodiment of the present invention.

FIG. 3 depicts example workflow 300 of a program within the computational environment of FIG. 1, in accordance with an illustrative embodiment of the present invention. Example workflow 300 contains training dataset 302, a dataset containing a plurality of data points; bootstrap datasets 304, a plurality of randomly sampled datasets based on training dataset 302; explanatory variable sets 306, a plurality of extracted explanatory variable sets based on bootstrap datasets 304; hyperparameter sets 308, a plurality of hyperparameter sets that contain over-training hyperparameters; and weak SVMs 310, a plurality of weak SVMs trained with bootstrap datasets 304, explanatory variable sets 306, and hyperparameter sets 308. In example workflow 300, program 150 utilizes training dataset 302 to create bootstrap datasets 304. Program 150 then utilizes bootstraps datasets 304 to extract explanatory variable sets 306. Responsive to the program 150 extracting explanatory variable sets 306, program 150 generates hyperparameter sets 308 and utilizes bootstrap datasets 304, explanatory variable sets 306, and hyperparameter sets 308 to create, train, and maintain weak SVMs 310. Responsive to program 150 creating SVMs 310, program 150 utilizes SVMs 310 to predict or classify one or more unknown datapoints.

Figure 4:
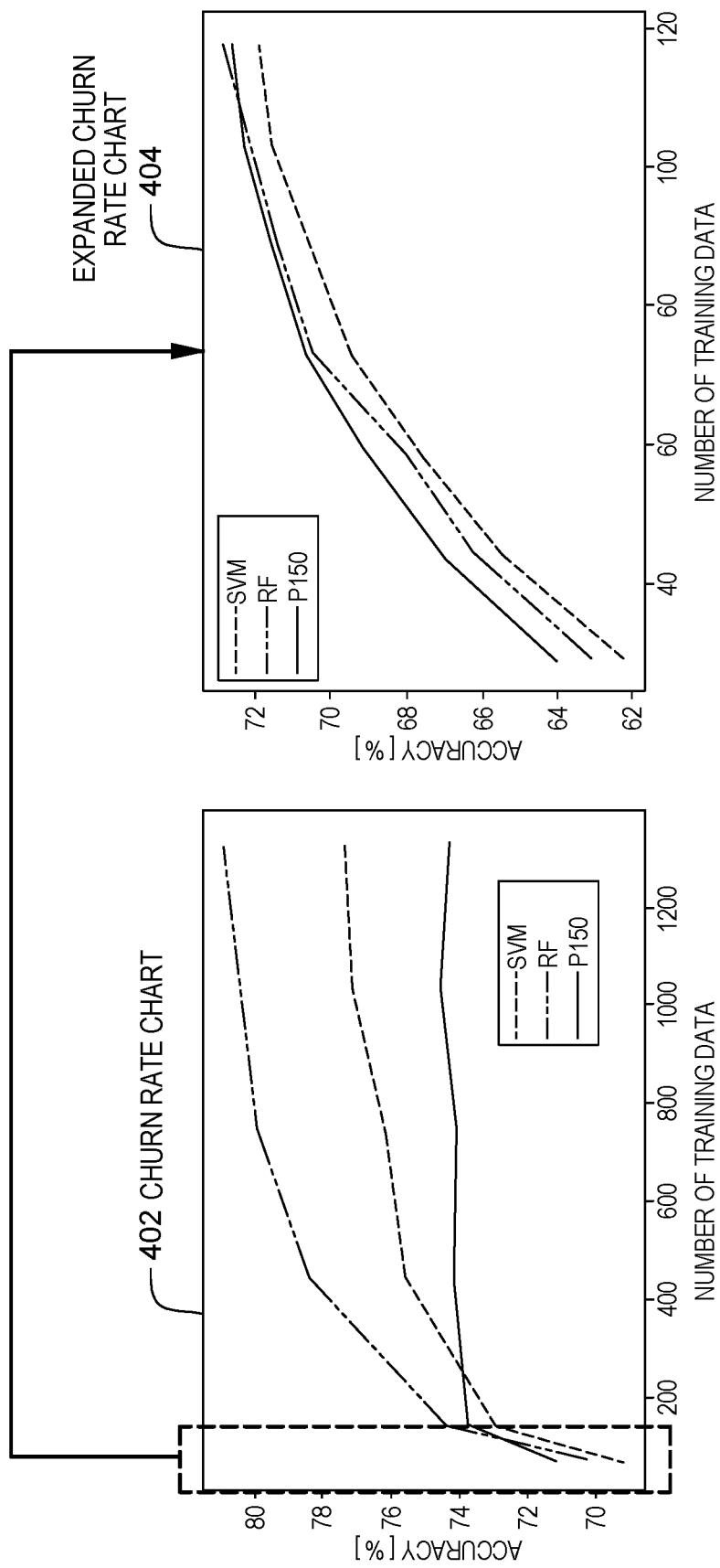
FIG. 4 illustrates exemplary charts of a program within the computational environment of FIG. 1, in accordance with an embodiment of the present invention.

FIG. 4 depicts exemplary charts 400 illustrating exemplary charts and statistics of a program within the computational environment of FIG. 1, in accordance with an embodiment of the present invention. In an embodiment, program 150 generates exemplary charts 400 containing churn rate chart 402, a chart depicting accuracy levels of a SVM, random forest, and program 150; and expanded churn rate chart 404, a chart depicting an expanded view of a subsection of churn rate chart 402. Exemplary charts 400 depicts the average prediction accuracy of 100 trials of weak learned SVMs (M=3, N=3, k=25) trained to predict churn rate where the training data was shuffled every trial. Exemplary charts 400 demonstrates that when the amount of training data is extremely small, there is an effect of program 150 improving accuracy by 2% with respect to a single SVM and by 1% with respect to random forest. Program 150 has an advantage over a small number of training data, but no advantage when the number of training data is large.

Figure 5:
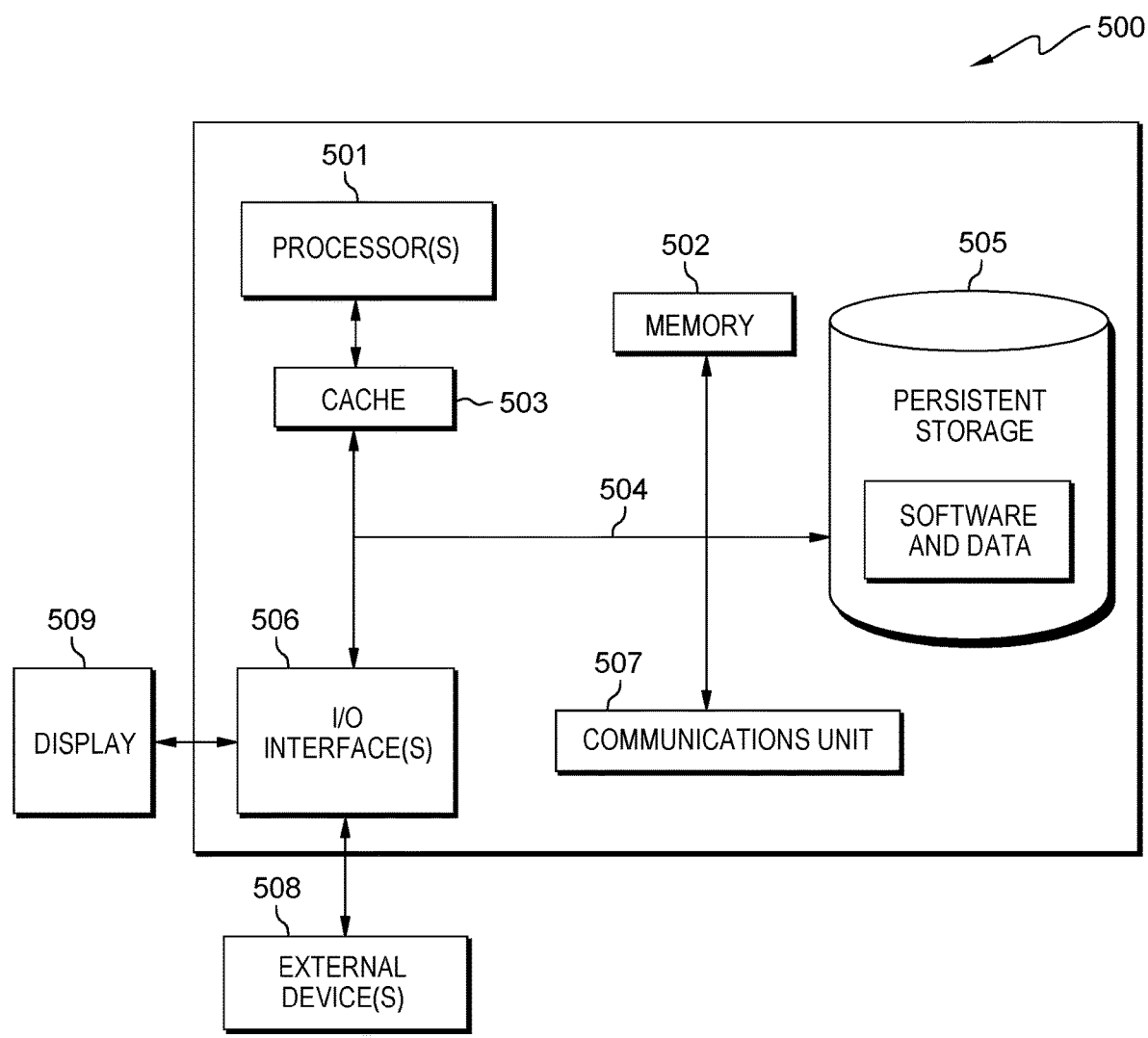
FIG. 5 is a block diagram of components of the server computer, in accordance with an embodiment of the present invention.

FIG. 5 depicts a block diagram of components of server computer 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server computer 120 each include communications fabric 504, which provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications, and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of computer processor(s) 501 by holding recently accessed data, and data near accessed data, from memory 502.

Program 150 may be stored in persistent storage 505 and in memory 502 for execution by one or more of the respective computer processor(s) 501 via cache 503. In an embodiment, persistent storage 505 includes a magnetic hard disk drive. Alternatively, or in addition to a magnetic hard disk drive, persistent storage 505 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Software and data 412 can be stored in persistent storage 505 for access and/or execution by one or more of the respective processors 501 via cache 503.

Communications unit 507, in these examples, provides for communications with other data processing systems or devices. In these examples, communications unit 507 includes one or more network interface cards. Communications unit 507 may provide communications through the use of either or both physical and wireless communications links. Program 150 may be downloaded to persistent storage 505 through communications unit 507.

I/O interface(s) 506 allows for input and output of data with other devices that may be connected to server computer 120. For example, I/O interface(s) 506 may provide a connection to external device(s) 508, such as a keyboard, a keypad, a touch screen, and/or some other suitable input device. External devices 508 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 505 via I/O interface(s) 506. I/O interface(s) 506 also connect to a display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG) illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   generating, by one or more computer processors, a plurality of hyperparameter sets, wherein each hyperparameter set in the plurality of hyperparameter sets contains one or more hyperparameters varied to increase model inaccuracy through over-training in one or more models, over-training includes overfitting or underfitting;

creating, by one or more computer processors, a plurality of weak models utilizing a created bootstrap dataset in a plurality of created bootstrap datasets, a corresponding extracted feature set, and a corresponding hyperparameter set in the generated plurality of hyperparameter sets, wherein each weak model in a created plurality of weak models shares at least the created bootstrap dataset, the extracted feature set, the generated hyperparameter set, a machine learning technique, or a model architecture; and predicting, by one or more computer processors, a classification for an unknown datapoint by aggregating the created plurality of weak models.

2. The method of claim 1, further comprising:
creating, by one or more computer processors, the plurality of bootstrap datasets from a training dataset.

3. The method of claim 2, wherein creating the plurality of bootstrap datasets from the training dataset, comprises:
determining, by one or more computer processors, a size of the bootstrap dataset in the plurality of bootstrap datasets;
randomly selecting, by one or more computer processors, a training sample from the training dataset; and
adding, by one or more computer processors, the training sample to the bootstrap dataset until the bootstrap dataset meets the determined size, wherein the training sample is included in multiple bootstrap datasets in the created plurality of bootstrap datasets.

4. The method of claim 2, further comprising:
generating, by one or more computer processors, the plurality of feature sets for each bootstrap dataset in the created plurality of bootstrap datasets.

5. The method of claim 4, wherein generating the plurality of feature sets for each bootstrap dataset in the created plurality of bootstrap datasets, comprises:
extracting, by one or more computer processors, one or more independent variables and features from each bootstrap dataset in the plurality of created bootstrap datasets; and
associating, by one or computer processors, respectively extracted independent variables and features with a corresponding bootstrap dataset in the plurality of created bootstrap datasets.

6. The method of claim 1, wherein predicting the classification for the unknown datapoint by aggregating the plurality of created models, comprises:
predicting, by one or more computer processors, the classification utilizing a majority decision of the created plurality of weak models.

7. The method of claim 1, wherein predicting the classification for the unknown datapoint by aggregating the plurality of created models, comprises:
predicting, by one or more computer processors, the classification utilizing a calculated average of the predictions outputted by each model in the created plurality of models.

8. The method of claim 1, further comprising:
deploying, by one or more computer processors, one or more created models as a unified ensemble of models.

9. The computer-implemented method of claim 1, wherein a loss function for each weak model in the created plurality of weak models comprises a cost parameter ranging between $10^2$ and $10^6$ and a regularization term ranging between $-4$ and $-2$.

10. A computer program product comprising:
one or more computer readable storage media and program instructions stored on the one or more computer readable storage media, the stored program instructions comprising:
program instructions to generate a plurality of hyperparameter sets, wherein each hyperparameter set in the plurality of hyperparameter sets contains one or more hyperparameters varied to increase model inaccuracy through over-training in one or more models, wherein over-training includes overfitting or underfitting;
program instructions to create a plurality of weak models utilizing a created bootstrap dataset in a plurality of created bootstrap datasets, a corresponding extracted feature set, and a corresponding hyperparameter set in the generated plurality of hyperparameter sets, wherein each weak model in a created plurality of weak models shares at least the created bootstrap dataset, the extracted feature set, the generated hyperparameter set, a machine learning technique, or a model architecture; and
program instructions to predict a classification for an unknown datapoint by aggregating the created plurality of weak models.

11. The computer program product of claim 10, wherein the program instructions, stored on the one or more computer readable storage media, further comprise:
program instructions to create the plurality of bootstrap datasets from a training dataset.

12. The computer program product of claim 11, wherein the program instructions to create the plurality of bootstrap datasets from the training dataset comprise:
program instructions to determine a size of the bootstrap dataset in the plurality of bootstrap datasets;
program instructions to randomly select a training sample from the training dataset; and
program instructions to add the training statement to the bootstrap dataset until the bootstrap dataset meets the determined size, wherein the training sample is included in multiple bootstrap datasets in the created plurality of bootstrap datasets.

13. The computer program product of claim 11, wherein the program instructions, stored on the one or more computer readable storage media, further comprise:
program instructions to generate the plurality of feature sets for each bootstrap dataset in the created plurality of bootstrap datasets.

14. The computer program product of claim 10, wherein a loss function for each weak model in the created plurality of weak models comprises a cost parameter ranging between $10^2$ and $10^6$ and a regularization term ranging between $-4$ and $-2$.

15. A computer system comprising:
one or more computer processors;
one or more computer readable storage media; and
program instructions stored on the computer readable storage media for execution by at least one of the one or more processors, the stored program instructions comprising:
program instructions to generate a plurality of hyperparameter sets, wherein each hyperparameter set in the plurality of hyperparameter sets contains one or more hyperparameters varied to increase model inaccuracy through over-training in one or more models, wherein over-training includes overfitting or underfitting;
program instructions to create a plurality of weak models utilizing a created bootstrap dataset in a plurality of created bootstrap datasets, a corresponding extracted feature set, and a corresponding hyperparameter set in the generated plurality of hyperparameter sets, wherein each weak model in a created plurality of weak models shares at least the created bootstrap dataset, the extracted feature set, the generated hyperparameter set, a machine learning technique, or a model architecture; and program instructions to predict a classification for an unknown datapoint by aggregating the created plurality of weak models.

16. The computer system of claim 15, wherein the program instructions, stored on the one or more computer readable storage media, further comprise:

program instructions to create the plurality of bootstrap datasets from a training dataset.

17. The computer system of claim 16, wherein the program instructions to create the plurality of bootstrap datasets from the training dataset comprise:

program instructions to determine a size of the bootstrap dataset in the plurality of bootstrap datasets;

program instructions to randomly select a training sample from the training dataset; and program instructions to add the training sample to the bootstrap dataset until the bootstrap dataset meets the determined size, wherein the training statement is included in multiple bootstrap datasets in the created plurality of bootstrap datasets.

18. The computer system of claim 16, wherein the program instructions, stored on the one or more computer readable storage media, further comprise:

program instructions to generate the plurality of feature sets for each bootstrap dataset in the created plurality of bootstrap datasets.

19. The computer system of claim 15, wherein the program instructions stored, on the one or more computer readable storage media, further comprise:

program instructions to deploy one or more created models as a unified ensemble of models.

20. The computer system of claim 15, wherein a loss function for each weak model in the created plurality of weak models comprises a cost parameter ranging between $10^2$ and $10^6$ and a regularization term ranging between −4 and −2.

* * * * *